United States Patent
Jones

(10) Patent No.: US 8,215,559 B2
(45) Date of Patent: Jul. 10, 2012

(54) SECURE CORE MATERIAL FOR DOCUMENTS

(75) Inventor: Robert L. Jones, Andover, MA (US)

(73) Assignee: L-1 Secure Credentialing, Inc., Billerica, MA (US)

(*) Notice: Subject to any disclaimer, the term of this patent is extended or adjusted under 35 U.S.C. 154(b) by 0 days.

(21) Appl. No.: 13/081,585

(22) Filed: Apr. 7, 2011

(65) Prior Publication Data

US 2011/0204141 A1    Aug. 25, 2011

Related U.S. Application Data

(60) Division of application No. 12/917,355, filed on Nov. 1, 2010, now Pat. No. 7,938,333, which is a continuation of application No. 11/625,665, filed on Jan. 22, 2007, now Pat. No. 7,823,791, which is a continuation-in-part of application No. 11/236,406, filed on Sep. 26, 2005, now abandoned.

(60) Provisional application No. 60/760,621, filed on Jan. 20, 2006.

(51) Int. Cl.
    *G06K 19/06*    (2006.01)

(52) U.S. Cl. ............... 235/491; 235/380; 427/7; 222/16

(58) Field of Classification Search ............... 235/491, 235/380; 427/7; 222/16
See application file for complete search history.

*Primary Examiner* — Kristy A Haupt

(74) *Attorney, Agent, or Firm* — Mintz, Levin, Cohn, Ferris, Glovsky and Popeo, P.C.

(57) ABSTRACT

Particles conveying a code are incorporated into polymer matrix to form a core document substrate. These particles may be colored to create a distinctive look of the document that makes it unique for a particular document issuer and enables visual authentication. Addition of a covert attribute to the particle, such as a UV pigment or hidden layer of material, allows a covert, forensic characteristic and it also allows a mathematical description to be calculated describing the random distribution of a specific area on a document and then captured on it (e.g., in the bar code or magnetic stripe or digital watermark on an ID document).

11 Claims, 5 Drawing Sheets

SECURE CORE MATERIAL FOR DOCUMENTS

RELATED APPLICATIONS

The present application is a Divisional of U.S. patent application Ser. No. 12/917,355, filed Nov. 1, 2010, now U.S. Pat. No. 7,938,333, issued May 10, 2011, which is a Continuation of U.S. patent application Ser. No. 11/625,665, filed Jan. 22, 2007 now U.S. Pat No. 7,823,791 which is a Continuation-in-Part of U.S. patent application Ser. No. 11/236,406, filed Sep. 26, 2005 now abandoned, and claims benefit of U.S. Provisional Application No. 60/760,621, filed Jan. 20, 2006. Each of the above U.S. patent documents is herein incorporated by reference.

BACKGROUND

As counterfeiters become increasingly sophisticated in creating counterfeit secure documents (either from scratch or modifying valid documents), there is need for increasingly effective security measures to thwart them. One way to thwart counterfeiters is to insert features into documents that are difficult to reproduce. In some cases, these features are intended to be covert so that it is difficult for the counterfeiter to even identify their presence on the document. As an additional layer of security, these features should have a linking relationship with other features that interlock the features to increase the difficulty in accurately reproducing the relationship and show evidence of tampering when the relationship is broken. The attributes identified above are needed for a broad spectrum of secure documents, and are particularly useful in identification documents. To provide context for security features in identification documents, a description of these documents and methods for creating them follows below.

Secure Documents

Secure documents, and in particular, identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

For the purposes of this disclosure, ID documents are broadly defined herein, and include, e.g., credit cards, bank cards, phone cards, passports, driver's licenses, network access cards, employee badges, debit cards, security cards, smart cards (e.g., cards that include one more semiconductor chips, such as memory devices, microprocessors, and microcontrollers), contact cards, contactless cards, proximity cards (e.g., radio frequency (RFID) cards), visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc.

Many types of identification documents carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

FIGS. 1 and 2 illustrate a front view and cross-sectional view (taken along the A-A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material (e.g., TESLIN (available from PPG Industries), polyvinyl chloride (PVC) material, polyester, polycarbonate, etc.). The core 20 is laminated with a transparent material, such as clear polycarbonate, PVC or polyester material 22, which, by way of example, can be about 1-10 mil thick. The composite of the core 20 and clear laminate material 22 form a so-called "card blank" 25 that can be up to about 27 to 33 mils thick in accordance with ANSI standards. Information 26a-c is printed on the card blank 25 using a method such as Laser Xerography or Dye Diffusion Thermal Transfer ("D2T2") printing (e.g., as described in commonly assigned U.S. Pat. No. 6,066,594, which is incorporated by reference). The information 26a-c can, for example, comprise variable information (e.g., bearer information) and an indicium or indicia, such as the invariant or nonvarying information common to a large number of identification documents, for example the name and logo of the organization issuing the documents. The information 26a-c may be formed by any known process capable of forming the indicium on the specific core material used.

To facilitate printing of data on the card structure, an image receiving layer is applied to the card structure prior to printing for some printing technologies. One type of printing technology that uses an image receiving layer is D2T2 printing. U.S. Pat. Nos. 6,066,594 and 5,334,573 describe image receiving layers for D2T2 printing. A sheet or layer which is comprised of a polymer system of which at least one polymer is capable of receiving image-forming materials from a donor sheet upon the application of heat. The polymer system of the receiving sheet or layer is incompatible or immiscible with the polymer of the donor sheet at the receiving sheet/donor sheet interface to minimize adhesion between the donor sheet and the receiving sheet or layer during printing. The polymer system of the receiving sheet or layer can be substantially free from release agents, such as silicone-based oils, poly(organosiloxanes), fluorinated polymers, fluorine- or phosphate-containing surfactants, fatty acid surfactants and waxes. Binder materials for the dyes are immiscible with the polymer system of the image-receiving layer. The most common image-receiving layer polymers are polyester, polycaprolactone and poly(vinyl chloride). Processes for forming such image-receiving layers are also described in detail in these patents; in most cases, the polymer(s) used to form the image-receiving layer are dissolved in an organic solvent, such as methyl ethyl ketone, dichloromethane or chloroform, and the resultant solution coated on to the polymer layer using conventional coating apparatus, and the solvent evaporated to form the image-receiving layer. However, if desired the image-receiving layer can be applied to the polymer layer by extrusion casting, or by slot, gravure or other known coating methods.

Other forms of image receiving layers include image receiving layers for Xerographic printing and inkjet printing. These image receiving layers are applied to substrates such as paper or plastic and comprise materials that enhance reception of ink or dye to the substrate. Image receiving layers for Xerographic printing are sometimes referred to as "laser lock" or "toner lock."

To protect the information that is printed, an additional layer of transparent overlaminate 24 can be coupled to the card blank and printed information. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1 -20 mils. Lamination of any laminate layer(s) to any other layer of material (e.g., a core layer) can be accomplished using known lamination processes.

In ID documents, a laminate can provide a protective covering for the printed substrates and a level of protection against unauthorized tampering (e.g., a laminate would have to be removed to alter the printed information and then subsequently replaced after the alteration). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581, A co-extruded lamination technology appears in U.S. patent application Ser. No. 10/692,463. Each of these U.S. patents and applications is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

Manufacture Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver renews her license by mail or over the Internet, then receives a drivers license card through the mail.

A CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner).

Centrally issued identification documents can be produced from digitally stored information and generally comprise an opaque core material (also referred to as "substrate"), such as paper or plastic, sandwiched between two or more layers of clear plastic laminate, such as polyester, to protect the aforementioned items of information from wear, exposure to the elements and tampering. U.S. Pat. No. 6,817,530, which is hereby incorporated by reference, describes approaches for manufacturing identification documents in a central issue process.

In contrast to CI identification documents, OTC identification documents are issued immediately to a bearer who is present at a document-issuing station. An OTC assembling process provides an ID document "on-the-spot". An example of an OTC assembling process is a Department of Motor Vehicles ("DMV") setting where a driver's license is issued to a person, on the spot, after a successful exam. In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized poly(vinyl chloride) or have a composite structure with polyester laminated to 0.5-4.0 mil (13-104.mu.m) poly (vinyl chloride) film on the outside of typical PVC or Composite cards, which provides a suitable image receiving layer for heat transferable dyes which form a photographic image, together with any variant or invariant data required for the identification of the bearer. These data are subsequently protected to varying degrees by clear, thin (0.125-0.250 mil, 3-6.mu.m) overlay patches applied at the printhead, holographic hot stamp foils (0.125-0.250 mil 3-6.mu.m), or a clear polyester laminate (0.5-10 mil, 13-254.mu.m) supporting common security features. These last two types of protective foil or laminate sometimes are applied at a laminating station separate from the printhead. The choice of laminate dictates the degree of durability and security imparted to the system in protecting the image and other data. One form of overlay is referred to as a "transferred panel" or "O-panel,". This type of panel refers to a panel in the print ribbon that is transferred to the document with the use of the printhead.

SUMMARY

The invention provides security features for secure documents, including features that enable verification. The invention also provides methods for making the security features, document structures including these features, and methods for evaluating these features in suspect documents.

One aspect of the invention is a secure document core material comprising a synthetic printing material such as polyolefin or silica filled polyolefin, a non-reactive absorbent material distributed in the synthetic printing material, and a covert material adhering to particles of the absorbent material. One example of the absorbent material is clay, and an example of the covert material is a pigment that is detectable in response to non-visible light illumination, such as a fluorescing UV pigment.

Another aspect of the invention is a secure document. The document has a synthetic core comprising a polymer and a non-reactive absorbent material distributed in the polymer. A covert material adheres to particles of the absorbent material. In particular, for example, a covert pigment is adheres to particles of clay that are distributed within the polymer.

In one embodiment of the secure document, the covert material has a distribution within the synthetic core that is readable by scanning the secure document with an illumination source. A representation of the distribution is encoded in a machine readable data carrier within the secure document. This relationship between attributes of the care and the machine readable data enables automated authentication by scanning an image of the document (e.g., with a non-visible light source), computing a representation of the distribution from the scanned image, and comparing it with the representation in the machine readable data carrier.

Yet another aspect of the invention is a method of making a secure synthetic print media. The method includes mixing clay particles with a covert pigment such that the covert pigment adheres to the clay particles, and mixing the clay particles into a synthetic print media material.

Another aspect of the invention is a document core material comprising a core of polyolefin, synthetic paper or print substrate, and particles dispersed in this core, the particles each comprising layers of material, the particles having at least one visible color such that the dispersed particles provide a visibly verifiable authentication attribute for the core material, and the particles having a non-visible forensic material.

Another aspect of the invention is a secure document comprising a synthetic core, the synthetic core comprising a polymer and particles distributed in the polymer, the particles comprising two or more layers; and a covert material conveyed in one or more of the layers of the particles.

Another aspect of the invention is a method of making a secure synthetic print media comprising: providing particles having two or more layers, at least one layer conveying a visible out of gamut color and a covert layer conveying a material visible with non-visible illumination; and mixing the particles into a synthetic print media material.

Additional inventive features include methods and systems for authenticating documents, and in particular, methods for authenticating documents made with the materials and methods described in this document.

Additional features will become apparent with reference to the following detailed description and accompanying drawings.

BRIEF DESCRIPTION OF THE DRAWINGS

The advantages, features, and aspects of embodiments of the invention will be more fully understood in conjunction with the following detailed description and accompanying drawings, wherein.

Figure 1:
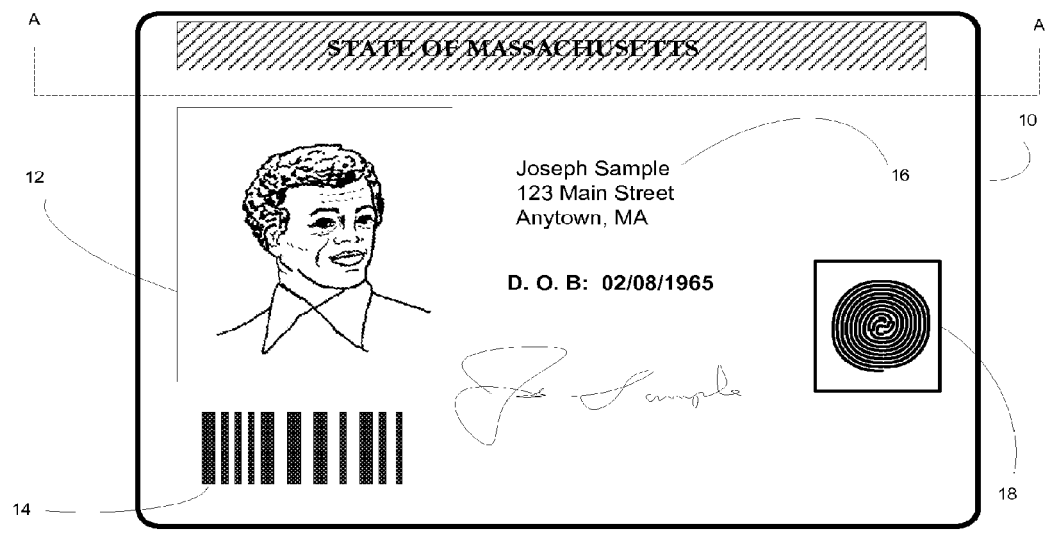
FIG. 1 is an illustrative example of an identification document.
Figure 2:
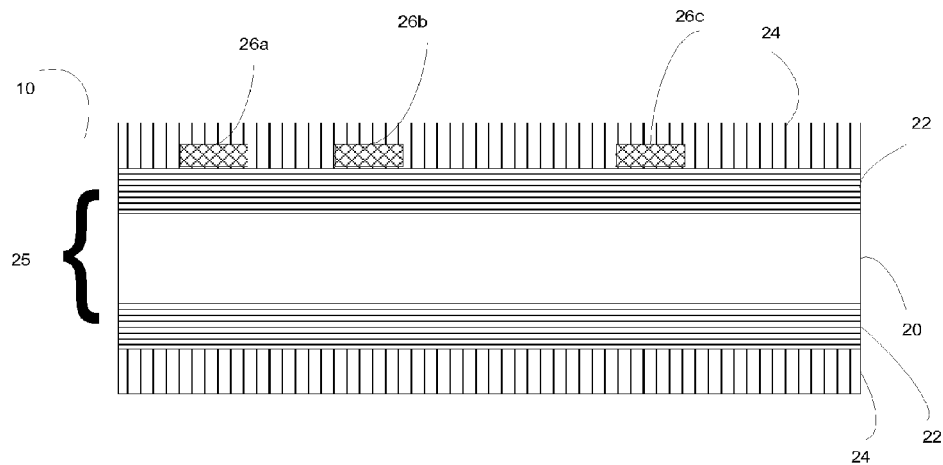
FIG. 2 is an illustrative cross section of the identification document of FIG. 1, taken along the A-A line.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

A non-reactive but highly absorbent material, such as clay, is incorporated into a synthetic print media such as a polyolefin/silica matrix to form a core document substrate. This absorbent material may be added to create a distinctive look of the print media. Clay particles are added to the print media in measured quantities at a known particle size distribution so that the core looks substantially the same from the front, back and side to the curious viewer. Addition of a covert material, such as a UV pigment, introduces a covert characteristic into the media. It also allows a mathematical description to be calculated describing the distribution of the covert material in a specific area on a document, which is then stored on a document made from the print media (e.g., a representation of the distribution stored in a machine readable data carrier on the document such as a bar code, magnetic stripe or digital watermark). Each document is unique by virtue of the clay's distribution within the document's core. The material is buried within the document, and the unique distribution for each document is protected by virtue of the construction for the entire length of the document's life. Since the activation and excitation of the UV pigment adhered/adsorbed onto the surface will not be disturbed by wear and tear, the signature will remain constant over the life of the card.

Figure 3:
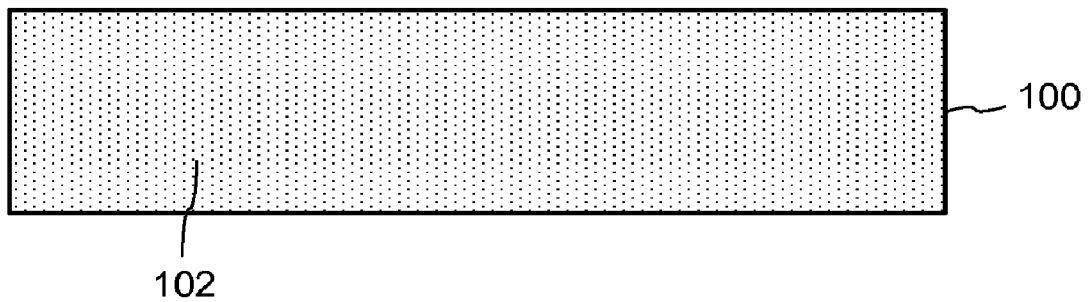
FIG. 3 is a diagram illustrating a cross section of a synthetic print media with covert material distributed in it.

FIG. 3 a diagram illustrating a cross section of a synthetic print media 100 with covert material 102 distributed in it. In one embodiment, the synthetic print media is ARTISYN from Daramic, LLC, which is a unit of Polypore in Owensboro, Ky., ARTISYN synthetic paper is a silica-filled, polyolefin printing substrate. An alternative synthetic print media is TESLIN. TESLIN is the tradename for a silica-filled porous synthetic printing sheet from PPG.

In one embodiment, a covert pigment adheres to clay particles, which serve as a non-reactive, absorbent host material for the pigment, and these clay particles with covert pigment attached 102 are distributed into the polyolefin/silica matrix of the ARTISYN material to form a secure print media 100.

Initial tests show that 40 micron clay particles are suitable as hosts for covert pigment, but the particle size and distribution may vary. The covert pigment in this embodiment is a UV fluorescing pigment called SC 4 from Angstrom. Other covert pigments may be used as well.

Figure 4:
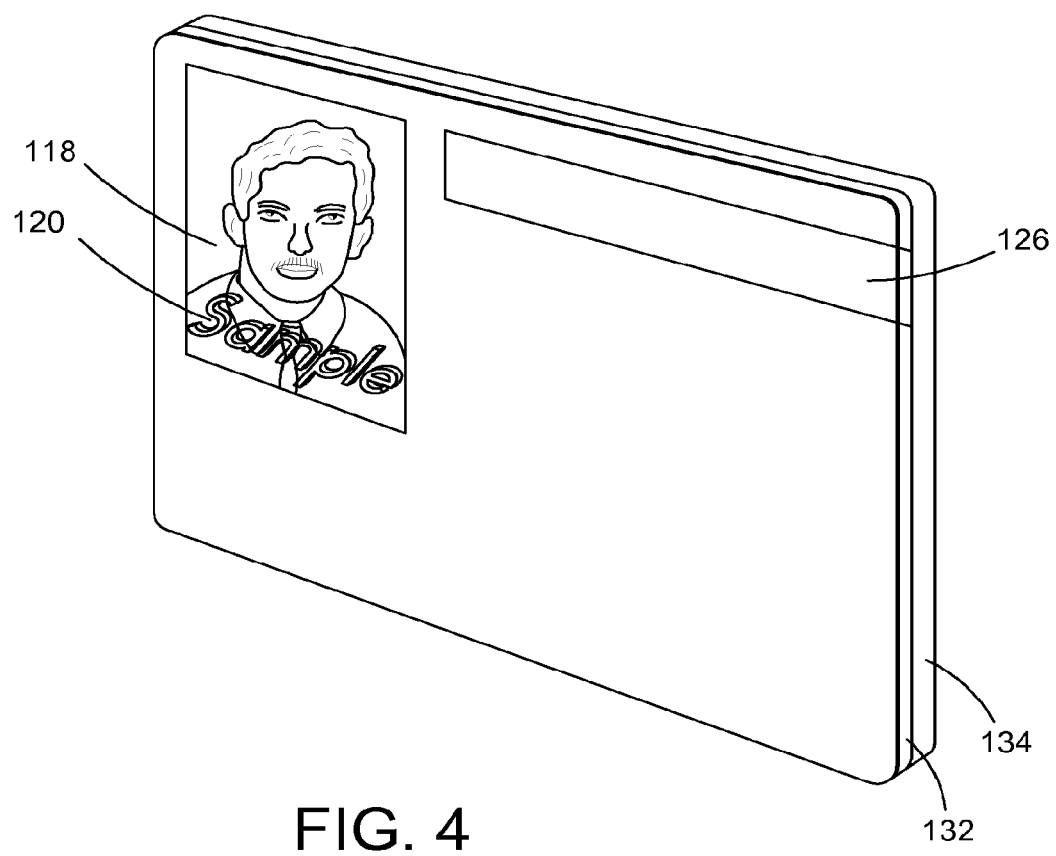
FIG. 4 is a diagram illustrating a secure document made using the secure core material of FIG. 3.

As shown in FIG. 4, the secure printed media may be used to make an ID document. The ID document includes information and security features such as a photo of the bearer 118, a security feature embedded in the photo 120 (such as a covert or visible printing of bearer information), and other fixed and variable information 126. The secure print media of FIG. 3 is used as a secure core 134 of the document. For example, in CI manufacturing process, the photo and security features are printed on the secure core (e.g., by offset or Xerographic printing), and then a laminate 132 is applied over the secure core by platen press or other lamination process. Feature 126 may be a bar code, RF ID chip, or magnetic stripe that carries a representation of the distribution of covert material in the secure core. One example of the representation is a hash, such as a secure hash (e.g., MD-5, SHA) of the spatial distribution. This representation of the distribution may be embedded in a digital watermark in the photo or other artwork on the document.

In an OTC manufacturing process, the secure core is used to create ID card blanks, which are coated with an image receiving layer. The image receiving layer enables printing by an OTC printer (e.g., D2T2 printing) of variable bearer information at the point of issuance. An overlaminate is applied after D2T2 printing. Also, a transparent laminate (e.g., polycarbonate or other laminate as noted above) may be applied to the core before coating with a D2T2 receptor layer.

Figure 5:
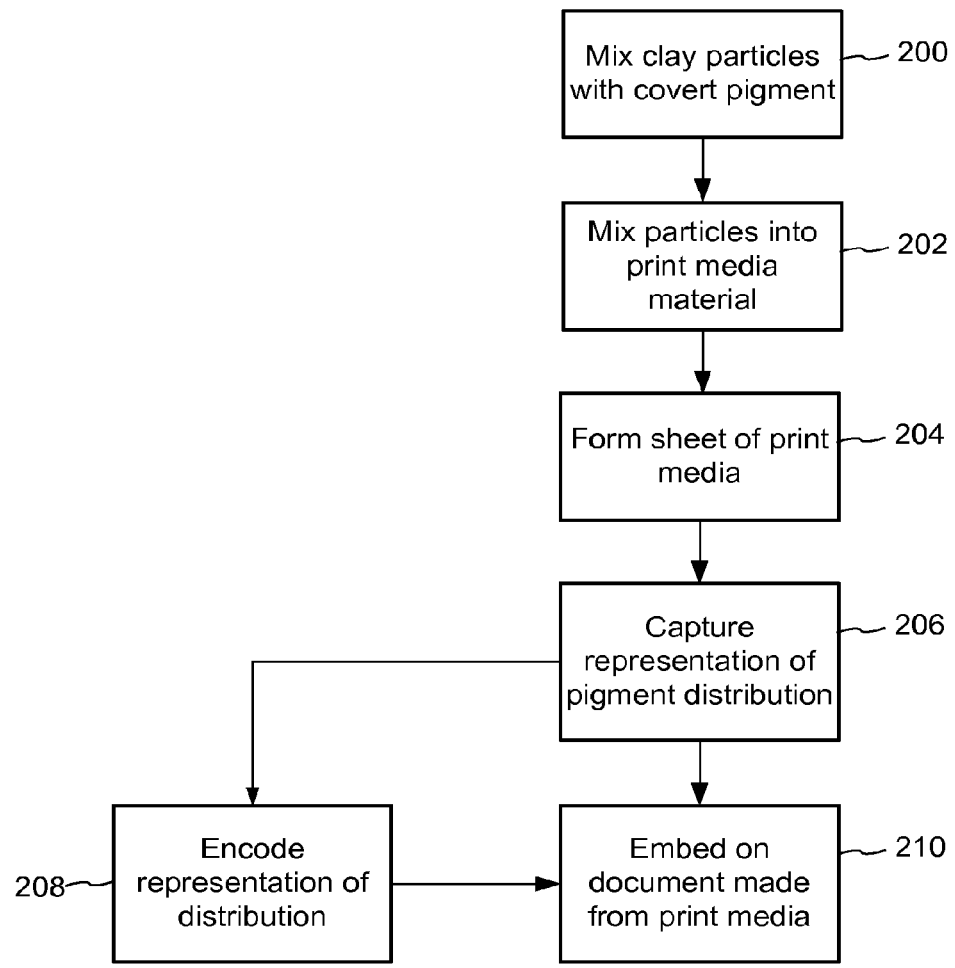
FIG. 5 is a flow diagram illustrating a method for making a secure print media.

FIG. 5 is a flow diagram illustrating a method for making a secure print media. As shown in step 200, the method begins by mixing a covert pigment (e.g., the UV pigment noted above) with an absorbent material, namely clay particles. In methods we tested, we mixed these materials by shaking the materials as follows:

Test 1: Above 95% of clay particles had fluorescence under UV light after shaking 20 g of clay and 1 g of SC 4 UV pigment from Angstrom together on a paint shaker for 3 hrs.

Test 2: About 100% of clay particles had fluorescence under UV light after shaking 20 g of clay and 2 g of SC 4 UV pigment from Angstrom together on a paint shaker for 3 hrs.

Above 98% of test 2 modified particles had fluorescence under UV light after mixing with mineral oil (1 part modified clay and 10 parts mineral oil) for 20 minutes and then washing out mineral oil with hexanes 3 times.

After preparing the clay particles with the covert material, the particles are introduced into the print media material, namely, the polyolefin/silica matrix prior to forming the print media material into synthetic printing sheets (202, 204).

A representation of the distribution of the covert pigment is captured by illuminating the material with a UV illumination source at a predetermined area on a sheet. This process is repeated for several different locations on a sheet, which each correspond to different documents that the sheet is cut into (206). Due to the method of mixing the covert material into the substrate, the spatial distribution of pigment is expected to be random and unique for each document.

Next, the representation of the distribution is encoded so that it can be included in the document and/or in a database for later authentication of the document (208). This may include filtering the spatial distribution into a binary sequence representing locations where the pigment is present or absent, hashing the sequence with a secure hash, and performing further error correction or data robustness coding (e.g., spread spectrum modulation, repetition coding, etc.). Next, the encoded representation is embedded on the document (210), preferably in a machine readable data carrier.

The encoded representation may be carried in a machine readable data carrier such as a digital watermark, RF chip, bar code, magnetic stripe, optical media, etc. A digital watermark may be steganographically embedded in the photo or background image of an ID document using techniques described in U.S. Pat. Nos. 6,122,403 and 6,614,914, which are hereby incorporated by reference.

Figure 6:
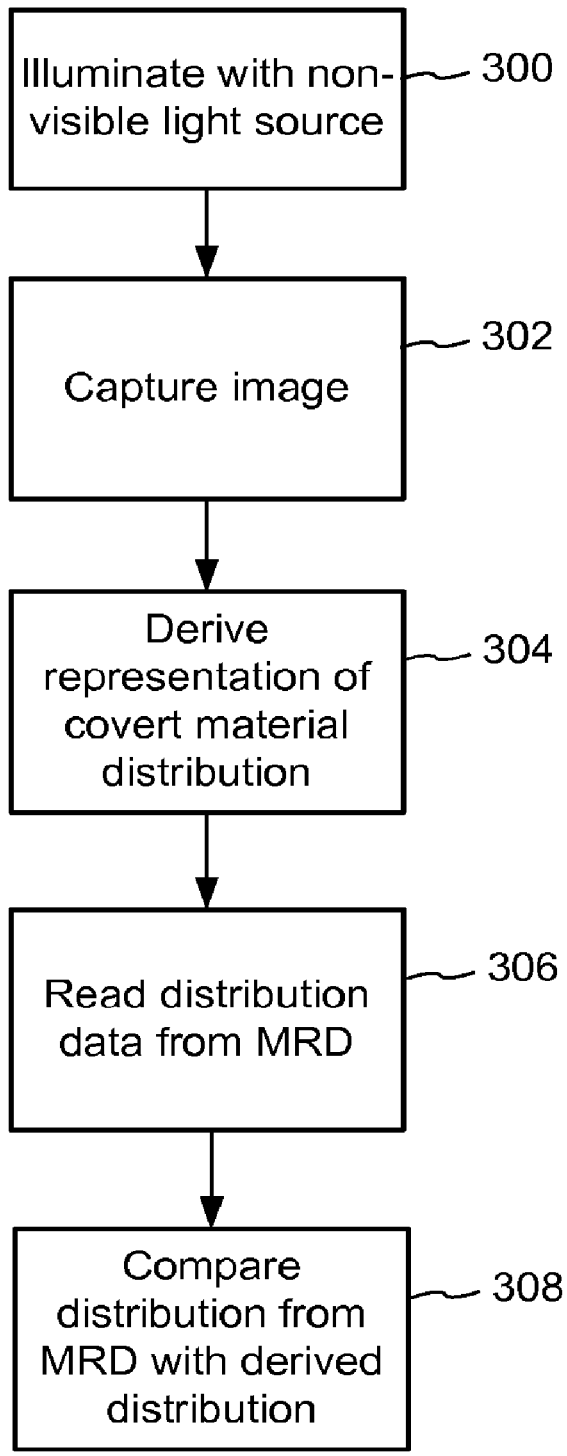
FIG. 6 is a flow diagram illustrating a method for authenticating a document using a secure print media and data carrier on the document.

FIG. 6 is a flow diagram illustrating a method of verifying a document based on the relationship between a unique distribution of the covert material in the core and its representation stored in the document. This method begins by illuminating the document with a radiation source that makes the covert pigment detectable (300). In the case of a UV fluorescing pigment, the illumination is in a band that causes the pigment to fluoresce. An image is captured of the document in this state (302).

A representation of the covert material distribution is computed in a similar manner as done for its original encoding (304). The stored representation is read from the document (or database entry which is referenced by an index on the document) (306). Additional inter-related information may be obtained from data elsewhere in the document (such as in chips, digital watermarks, bar codes magnetic stripes, OCR, etc.) and from a database indexed by an identifier carrier on the document.

Finally, this data is validated by evaluating the relationship between the various data read from and derived from the document and the database (308). This evaluation may include a comparison of numbers, a comparison of extracted patterns, evaluation of a hash derived from document attributes to a hash stored in the document, attempted decryption of data in the document based on a key derived from the document or database, etc. If the evaluation establishes that the relationship among the data elements is valid, the document is deemed to be valid.

Another type of particle for making a unique core material is a microparticle or security fiber. These particles may be dispersed within the core in addition to or as an alternative to the absorbent particles described above. One commercially available form of a microparticle is a MICROTAGGANT® identification particle from Microtrace, Inc. of Minneapolis, Minn. For more information on these particular types of identification particles, see U.S. Pat. Nos. 6,309,690, 4,390,452 and 4,053,433, which are hereby incorporated by reference.

In one implementation, the particles are associated with a particular document source, such as an issuer of identification codes. The particles are associated with the source by carrying a code represented as a sequence of distinct readable layers with properties such as color, visible in the UV, IR spectrum, magnetic, or thermachromic. These properties can be introduced by putting pigments or dyes having these properties in selected layers in a particular sequence. Looking beyond the particle itself, the core material may have a composite code comprised of the sub-codes from the different particle types within it. For example, the composite code is further represented through the concatenation of codes or code sequences for each of the particle types within the core material. The composite code is also represented and differentiated from other composite codes in the distribution and orientation of the different particle types in the core material. Different particle types, such as clay and taggant particles may be used in combination in ratios by volume of core material specifically associated with a document issuer, for instance.

One method to construct particles with a desired code sequence is as follows. Each element of the code sequence is associated with a particular color or property. The particle is then constructed in layers. In particular in one embodiment, a layered structure is constructed by sequentially layering coatings, each with different pigments in the coating. One particular form of coating is a UV curable acrylic coating. After two or more stages of applying and curing these coatings, the layered structure is a highly crosslinked material with thermoset properties. This layered structure is cryogenically ground into particles, which are then separated into desired sizes with a sieving method. Each of the particles carries a coded sequence corresponding to the layers.

A particular property of an element in the code sequence such as a desired color may be created by applying a dye to a side of a layer.

Particles made by this process have a platelet shape, meaning that they have a length and width in the X and Y plane substantially greater than the thickness in the Z direction. For example, the particles have lengths and widths on the order of mils and thickness on the order of a few microns. This enables the particles to line up along an orientation in the X and Y plane, with top layer forming one large face, and a bottom layer forming another large face parallel to the X and Y plane and the thickness in the Z direction transverse to the top, bottom and intervening layers. The particles disperse in a core material with this orientation, which enables the manufacture to construct a core with desired colors (based on selection of the colors of the layers) and additional covert properties (based on the selection of covert attributes such as only visible in UV or IR light and internal layers made covert by the obscuring coverage of surrounding layers). These covert features provide non-visible forensic attributes that can be used to verify the authenticity of a document and/or trace it to a particular source.

These particles are then integrated into the core material during its manufacture. One such manufacturing process is as follows. The particles are mixed with a core material comprising a high molecular weight polyolefin such as polyethylene (e.g., HDPE) in a mixing vessel operating with high sheer and torque. Mineral oil or suitable lubricating agent and high surface area silica (25 to 30%) are mixed with the polyolefin.

The mixture is extruded through an extrusion die to form a film of the core material. In one embodiment of the process, a roll process is used in which a sheet of the extruded film is passed through a counter flow bath of chlorinated solvent to extract the oils from the sheet. In one implementation, a three roll nip roll to roll machine transfers a 4 foot wide sheet at rate of about 100-150 feet through the solvent bath. The solvent is dried out and collected. The extraction of the oil from the sheet leaves a void volume (e.g., 25% air). The microvoids formed by the extracted oil combined with the high surface area silica create a core sheet that serves as a print media to receive printing by a variety of print methods, such as those referred to in this document for making ID documents.

In a final stage, the sheets of core material are tempered by slowly heating and holding at a temperature for a predetermined time period in an annealing process.

The dispersion of the particles in the polyolefin is such that ID cards cut from the sheet have a random arrangement of particles unique to the card. The cards are amenable to authentication using the authentication methods described above. In particular, this random arrangement is scanned from the ID document at the time of creation or issuance and loaded into a database entry associated with the document and/or stored on a machine readable data carrier on the document. In one embodiment of this approach, a numerical representation of the positions of the particles is coded into a string of numbers and hashed (e.g., through a cryptographic hash), with the hash stored in the data carrier on the document and/or in a database referenced by a document identifier on the document.

A digital watermark is a particularly suitable candidate for carrying a representation of the pattern or the identifier that references the database entry where the representation of the pattern is stored. The digital watermark is also particularly suitable for carrying the code sequence of the particle or the composite code sequence comprised of the codes of different particle types in the core material. The digital watermark can be combined into other security elements on one or more layers of the ID document, including laminate layers and the core layer itself. In particular, it can be embedded in background art, a photo, or security element like a hologram. The watermark signal can be conveyed in images marked by thermal transfer, ink jet, laser marking, etc. on the one or more layers of the ID document.

In addition, the selected colors of the particles gives the core material a unique color or colors, visible from different directions, which can be uniquely assigned to a particular issuer. One approach is to select an out of gamut color or colors for the particles and place them in a substantially white or off white core material like a polyolefin. This gives the white or off white core material a cast in the color of the particles carried within it. An out of gamut color is one that is not accurately reproducible by standard image scanning equipment, such as typical RGB scanners. The advantage of an out of gamut color is that it provides yet another authentication feature because attempts to reproduce the color with standard scanning equipment will yield a different color, with a detectable difference from the out of gamut color assigned to authorized issuer of the document.

The size of the particle can vary depending on the size of the core material. For a 10 Mil thick core layer, the particle size is preferably 5 to 10 Mil in the X-Y plane. The top and bottom faces of the particle can then be visible in the front and back of the 10 Mil film core material, and in some cases from its edge, as some particles align in the Z direction, where the core film is parallel with the X-Y plane and its edge is in the Z direction.

The use of particles in the core create a variety of ways to authenticate the core material. One is visual inspection of the core for the characteristic color conveyed in the particles relative to the neutral color of the host core material. Another approach is to check for a color shift in the core material due to inaccurate reproduction of the out of gamut color. Another is to read the code sequence or composite code sequence of the particles by image analysis or other forensic analysis of the core material. This code sequence can be read automatically by image scanning, with illumination in the proper bands, such as UV, IR, and white light. It can also be read through extraction of the particles and forensic analysis. Another approach is to check for the pattern of particles in the core material that has been recorded on the document or in a database. Combinations of two or more of these approaches may be used.

The code sequence can be uniquely associated with a particular document issuer, document source or manufacturing lot. The code sequence can be used to trace a document back to its manufacturing lot, source, and/or issuer.

In alternative embodiments, the particles described above are dispersed in different forms of synthetic print substrates or synthetic paper. Additional examples include polypropylene based synthetic paper, including foamed, extruded polypropylene.

In alternative embodiments, particles are dispersed in other document layer materials. In one embodiment, the particles are dispersed in extruded polymer material that forms the core layer of an identification document. Examples of polymer materials include polyester, polycarbonate, PVC, as well as blends of these materials, such as, in particular, a polycarbonate and polyester blend. One method of incorporating the particles in the core material is through masterbatching the particles into the polymer prior to extrusion. In one particular embodiment, for example, the particles are masterbatched in one material that is then coextruded with one or more additional layers to form a multilayer structure. Particles with different covert and visible attributes may be masterbatched into different materials, which are then coextruded to form a multilayer structure with a unique combination of particles. In one particular embodiment, particles of the type described above are masterbatched into a core material of polycarbonate or polycarbonate/polyester blend, which is then coextruded with outer layers of an amorphous polyester to form a coextruded document core material. Image receiving layers are optionally applied to the core to make it receptive to inks or toners used to print additional information on the document. Such layers may be applied as coatings or laminated layers as described above.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc. The term ID document is broadly defined herein to include these tags, maps, labels, packaging, cards, etc.

It should be understood that, in the Figures of this application, in some instances, a plurality of method steps may be shown as illustrative of a particular method, and a single method step may be shown as illustrative of a plurality of a particular method steps.

It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps.

In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A method of verifying, comprising:
providing a secure identification document, the secure identification document being made by:
mixing a non-reactive material with a covert material to form a plurality of particles;
blending the plurality of particles within a substrate polymer material to form a random distribution;
capturing a representation of the random distribution; and
embedding the representation in a machine readable data carrier within the secure identification document;
reading the random distribution of the plurality of particles embedded within the secure identification document;
deriving a representation of the read random distribution;
reading at least a portion of data stored in the machine readable data carrier within the secure identification document;
comparing the derived representation with the read data; and
verifying the secure identification document if the derived representative matches the read data.

2. The method of claim 1, further comprising: encoding the representation before embedding.

3. The method of claim 1, wherein the substrate polymer material is a polyolefin/silica matrix.

4. The method of claim 1, wherein the non-reactive material is clay.

5. The method of claim 1, wherein the covert material is a UV pigment.

6. The method of claim 1, wherein the random distribution of the plurality of particles remains constant over a usage life of the secure identification document.

7. The method of claim 1, wherein the representation is a mathematical description.

8. The method of claim 1, wherein the mathematical description is a hash.

9. The method of claim 1, wherein the machine readable data carrier comprises at least one of a bar code, a magnetic stripe, a digital watermark, a RF chip, and an optical media.

10. The method of claim 1, further comprising an image receiving layer adjacent to at least one surface of the substrate.

11. The method of claim 1, further comprising a laminate layer.

* * * * *